(12) United States Patent
Xiong et al.

(10) Patent No.: US 11,256,707 B1
(45) Date of Patent: Feb. 22, 2022

(54) PER-QUERY DATABASE PARTITION RELEVANCE FOR SEARCH

(71) Applicant: Amazon Technologies, Inc., Seattle, WA (US)

(72) Inventors: Pengcheng Xiong, Sunnyvale, CA (US); Bing Yin, Palo Alto, CA (US); Danqing Zhang, Mountain View, CA (US); William Headden, San Mateo, CA (US); Heran Lin, Mountain View, CA (US); Fan Yang, South San Francisco, CA (US); Ryoichi Kato, Sunnyvale, CA (US); Jiufeng Zhou, Mountain View, CA (US); Nicholas Blumm, Palo Alto, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 24 days.

(21) Appl. No.: 16/836,205

(22) Filed: Mar. 31, 2020

(51) Int. Cl.
| | |
|---|---|
| *G06F 16/2457* | (2019.01) |
| *G06F 16/2455* | (2019.01) |
| *G06N 3/04* | (2006.01) |
| *G06F 16/182* | (2019.01) |
| *G06K 9/62* | (2022.01) |
| *G06F 16/23* | (2019.01) |

(52) U.S. Cl.
CPC ...... *G06F 16/24578* (2019.01); *G06F 16/182* (2019.01); *G06F 16/23* (2019.01); *G06F 16/24554* (2019.01); *G06K 9/6256* (2013.01); *G06N 3/04* (2013.01)

(58) Field of Classification Search
CPC .... G06F 16/182; G06F 16/24578; G06N 3/08
See application file for complete search history.

(56) References Cited

U.S. PATENT DOCUMENTS

2020/0089808 A1 * 3/2020 Liu ........................ G06N 3/04

* cited by examiner

*Primary Examiner* — Hau H Hoang
(74) *Attorney, Agent, or Firm* — K&L Gates LLP

(57) ABSTRACT

Devices and techniques are generally described for per-query prediction of shard relevance for search. In some examples, a search system may receive a first search query. A first score may be determined for a first database partition, the first score indicating a relevancy of the first search query to first data stored by the first database partition. Similarly, a second score may be determined for a second database partition, the second score indicating a relevancy of the first search query to second data stored by the second database partition. A determination may be made that the first search query is related to the first data stored by the first database partition. A determination may be made, based at least in part on the second score, that the first search query is unrelated to the second data stored by the second database partition.

20 Claims, 6 Drawing Sheets

| Model | FFN | | | | | | |
|---|---|---|---|---|---|---|---|
| Tokenization | C1,2,3 W1,2 | | | | | | |
| Locale | UK | DE | FR | IT | ES | JP | US |
| Precision$_\alpha$ ($\alpha = 10^{-3}$) | 0.226 | 0.248 | 0.231 | 0.253 | 0.242 | 0.242 | 0.310 |
| Precision$_\alpha$ ($\alpha = 10^{-2}$) | 0.460 | 0.478 | 0.475 | 0.540 | 0.480 | 0.453 | 0.565 |
| Precision$_\alpha$ ($\alpha = 10^{-1}$) | 0.736 | 0.747 | 0.759 | 0.814 | 0.769 | 0.745 | 0.793 |
| Recall$_\alpha$ ($\alpha = 10^{-3}$) | 0.993 | 0.994 | 0.993 | 0.994 | 0.994 | 0.993 | 0.987 |
| Recall$_\alpha$ ($\alpha = 10^{-2}$) | 0.968 | 0.971 | 0.968 | 0.968 | 0.968 | 0.967 | 0.945 |
| Recall$_\alpha$ ($\alpha = 10^{-1}$) | 0.909 | 0.910 | 0.909 | 0.923 | 0.910 | 0.885 | 0.899 |

PER-QUERY DATABASE PARTITION RELEVANCE FOR SEARCH

BACKGROUND

Data stored in large databases, such as those employed by internet search engines and online retail catalogs, are often partitioned into separate partitions known as "shards." In the internet and product search context, each shard of a database is often stored on a separate database server in order to balance load. Separation of databases into shards distributed across different server instances reduces index size which generally improves search performance. Additionally, separation of a database into shards distributed across different server instances and/or physical machines may greatly improve search performance through load balancing and a reduced search set for the physical hardware. In typical implementations, some data stored within a shard may be exclusive to that shard, while other data may be stored in multiple shards.

BRIEF DESCRIPTION OF DRAWINGS

FIG. 3 depicts a table illustrating precision and recall values across different locales for the feed forward machine learning models described herein, in accordance with various embodiments of the present disclosure.

DETAILED DESCRIPTION

Figure 1:
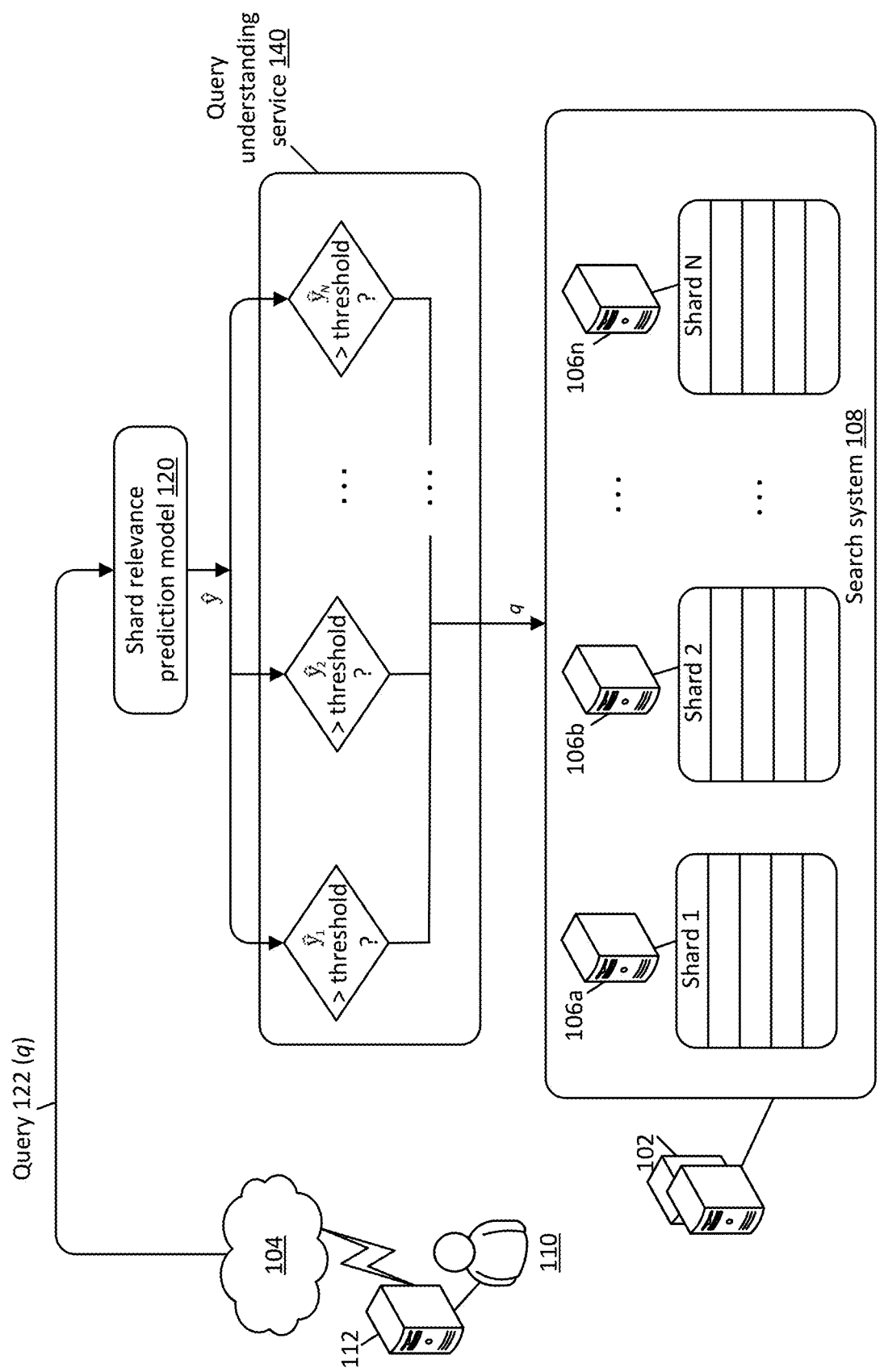
FIG. 1 is a block diagram illustrating per-query prediction of shard relevance during search, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Large-scale information retrieval systems often store documents in different search indexes, or shards. In product searches for e-commerce websites, a product is often assigned to a particular shard according to the product's category or categories. If an association can be determined between a search query and one or more product categories, infrastructure cost and compute overhead can be reduced by only retrieving search results (e.g., relevant products) from the most relevant shards. In various embodiments described herein, a machine learning model may be trained based on past user queries and past user behaviors to predict shard association for new queries. In various examples, a feed-forward neural network, with language-independent features, may be employed to provide low-latency prediction for the per-query shard relevance task. In various embodiments, machine learning models are described that may predict relevant shards for input search queries without degrading the user experience (e.g., in terms of accuracy and/or latency). Additionally, in various embodiments, the machine learning models may provide significant reduction in both infrastructure cost and compute overhead in the search context. Search of distributed information (e.g., data partitioned into multiple shards) is sometimes referred to herein as "federated search."

Online shopping has become an important part of people's daily life in recent years. The growth of e-commerce is accompanied with the growth of the cost to host the product search engine, as more products are indexed and more queries are issued by the customer. Sustainable growth of the product search services calls for control of the infrastructure cost while maintaining the same quality of service to the user.

Documents (e.g., product pages in the product search e-commerce context) may be partitioned in different shards, where each shard may host an inverted index and may execute document an independent instance of a retrieval algorithm. When the customer issues a query, the shard selection algorithm chooses the relevant shards to query. Within each shard, there may be multiple replicas (e.g., servers hosting the same inverted index). When each selected shard receives a query request, one replica is designated as being responsible for handling the request in a load-balanced manner. The responsible replica returns a ranked list of relevant documents for the input search query. The results from different selected shards (e.g., for the same query) are merged into a single, coherent ranked list and are returned to the user through result merging. The result merging algorithm is critical to balance the relevance and diversity of the result, especially for broad queries such as "The Wizard of Oz," for which movies, books, or toys (e.g., each being indexed in a separate shard) may be meaningful results depending on the user. Any result merging algorithm may be used to merge results returned from multiple shards.

In product search, documents are often assigned to shards according to the product taxonomy. Accordingly, each shard may be associated with its own semantics describing categories of documents indexed by that shard. Typically a product search query implies product category intent, and each query will be relevant to a limited number of shards. Retrieval efficiency may be improved and infrastructure cost may be reduced using shard selection in product search, relative to querying each shard for each product search query.

There are several challenges for shard selection in large-scale product search systems. First, most existing shard selection algorithms rely on corpora built from the documents in each shard (e.g., websites which are applicable to shard selection in the web search context). In contrast, product catalogs comprise documents (e.g., product pages and/or product descriptor data) with limited length of text information (e.g. title, description) while being rich in various attributes (e.g., category membership). Second, shard selection is part of the early retrieval process during search. Accordingly, shard selection may have strict latency requirements. Third, it may be important to quantify infrastructure cost in search systems upon software changes, for capacity planning purposes.

Described herein are various deep learning techniques for shard selection (e.g., shard relevant prediction) for product search. In various techniques described herein, instead of utilizing textual information from documents for shard selection, knowledge of products' shard membership data and past customer feedback related to product interaction may be used to predict per-query shard relevance. Since most product search queries have clear product category intent and the association between queries and shards is often sparse (e.g., a given query is often related to only a small number of the total number of shards), the classical shard selection problem in search is formulated herein as a multi-label query intent classification problem. In various example embodiments, light feed forward networks may be used to balance model prediction quality with the production inference latency. A "light" feed forward network as used herein may be a network with fewer layers relative to larger natural language processing models, for example. In some examples described herein, light feed forward networks may use a relatively small number of layers (e.g., 1-5 layers) as dependency between tokens (typically modeled using a larger number of layers) need not be modeled in the various implementations of the shard selection models described herein. Additionally, in various example embodiments, a deep learning model is deployed as an online inference service to predict shard relevance to incoming search queries. In various examples, the feed-forward networks described herein may achieve significant reductions in infrastructure cost, while maintaining the same or better relevance results for the retrieved documents.

Machine learning techniques are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model may be referred to as back propagation.

Generally, previous approaches for resource selection in federated search have followed one of three approaches: term-based approaches, sample-based approach, and feature-based approaches. Most early resource selection algorithms treat each individual source (e.g., data of each shard) as a single big document. The problem is reformulated into the document ranking problem. Variants of language-processing models have been used for this "large documents" ranking. Sample-based methods estimate the relevance of a shard by querying a small sample index of the shard's data. The sample is known as the centralized sample index (CSI). The query is run against the CSI and the document ranking is returned. Given the document ranking of the CSI, the document ranking of centralized complete database can be approximated using different methods known to those skilled in the art. The ranking of sampled documents of each shard may then used to quantify the relevance of each shard to the query. Recent methods have been focused on utilizing different features to estimate the relevance a query to a shard. These methods use training data to either train a classification model, or learning-to-rank model. Existing classification models are generative models defined as $$p(s_i|q) = \frac{p(q|s_i)p(s_i)}{p(q)} = \frac{p(q|s_i)p(s_i)}{\sum_j p(q|s_j)p(s_j)} \qquad (1)$$

where $s_i$ represents the i-th shard and q represents the input query. $p(q|s_i)$ can be calculated through a language model or using term frequency-inverse document frequency (TF-IDF).

Features used by traditional resource selection methods are (1) query-dependent corpus features, which describe how well query matches the corpus, (e.g., text data and/or other natural language data stored by any shard), (2) query-independent information like shard distribution features, and (3) click-through features which is user feedback in the form of clicks on collection documents in the search system.

Query Intent Classification

Described herein are techniques that reformulate the resource/shard selection problem as a multi-label query intent classification problem. For context, some prior work on query classification in information retrieval is described. Due to the small size of training data, most of the early research studied how to augment the query string input with various types of features (e.g., features derived from query logs, click-through data, search session data, and documents in target categories). Some more research has used larger training query datasets and deep learning methods for query feature embedding. For example, some approaches have used convolutional neural networks (CNN) to extract query vector representations as the features for the query classification. In other examples, long short term memory models (LSTMs) have been used for query classification on top of the query embedding.

Additionally, transformer-based model architectures like BERT (Devlin, J., Chang, M.-W., Lee, K., and Toutanova, K. *Bert: Pre-training of deep bidirectional transformers for language understanding.* In Proceedings of the 2019 Conference of the North American Chapter of the Association for Computational Linguistics: Human Language Technologies, Volume 1 (Long and Short Papers) (2019), pp. 4171-4186) may achieve large improvements on different natural language processing (NLP) tasks. Such transformer-based models may be fine-tuned for the downstream NLP tasks. However, these large scale pre-trained NLP models often have hundreds of millions of parameters, and are considerably slower than smaller neural networks, such as feed forward networks with relatively few layers. As such, use of such models for resource selection in federated search may not be optimal due to latency constraints, high request volume, and resource-constraint environments. Accordingly, described herein are smaller (relative to the NLP models described above) neural networks that may offer reduced search latency while offering state-of-the-art or better inference quality.

Described herein are various machine learning approaches to predict per-query shard relevance in order to determine a small number of the most relevant shards for a given search query. The various techniques described herein reformulate shard selection as a multi-label query intent classification problem in natural language processing. In an embodiment, user feedback data is used to train a deep learning model that can jointly predict the relevance score of all shards for each input search query.

Most existing resource selection techniques utilize text information from documents to build corpus for training the language models. However, such an approach can be expensive and complex for search systems at large scale, due to large document size, frequent document update, and SLAs (service level agreements) of different data feeds. In various embodiments described herein, a neural network is trained using document-shard membership data and implicit relevance feedback data (e.g., from user document clicks).

FIG. 1 is a block diagram illustrating per-query prediction of shard relevance during search, according to various embodiments of the present disclosure. In various examples, a user 110 (e.g., a user searching an online retailer for a product) may use a computing device 112 (e.g., a desktop computing device, a mobile computing device, etc.) to enter a search query to search for particular result data. In many of the examples provided herein, a user searching for a product via an online retailer's search system is described. However, it should be appreciated that the techniques described herein are broadly applicable to other search domains beyond the product search context. However, in some examples, the techniques described herein may offer particular advantages for search domains where the corpus data has relatively little associated text beyond taxonomy and/or category data (e.g., such as in product databases).

User 110 may use computing device 112 to submit a query q (122) over a network 104 to computing device(s) 102 providing a distributed search system 108. In various examples, network 104 is a wide area network, such as the Internet, while in other embodiments, the network 104 is a local area network (LAN) over which search queries are sent and search results are returned. In some further embodiments, network 104 is a combination of the Internet and a LAN. As shown, the distributed search system 108 may have one or more server instances 106a, 106b, ..., 106n. The server instances 106a, 106b, ..., 106n may be virtualized server instances executing on one or more physical machines. In some other examples, one or more of the server instances 106a, 106b, ..., 106n may represent a physical machine. In the example depicted in FIG. 1, each of the server instances 106a, 106b, ..., 106n may be associated with a shard. For example, server instance 106a is associated with Shard 1, server instance 106b is associated with Shard 2, etc. Each shard may store one or more categories of data. For example, in the online retail context, Shard 1 may store product data for the category books, Shard 2 may store product data for the categories movies and kitchenware, Shard 3 (not depicted) may store product data for the product category toys, etc. In general, the shards may store any combination of category data and the category data may be more specific or more general than the foregoing examples. Additionally, in an example, some product data may be stored in multiple shards (as the product data may correspond to multiple categories). For example, product data representing a particular pair of shoes may be stored in a first shard that stores product data of the category "active wear" and in a second shard that stores product data of the category "shoes."

In various examples, if a user submitted a query to a distributed search system, each shard may be separately queried whether or not the shard is likely to store data that is relevant to the query. However, such an approach wastes compute power, increases infrastructure overhead, and may lead to increased latency and congestion. Accordingly, in various embodiments described herein, a shard relevance prediction model 120 may predict a probability (e.g., a relevance score) that each shard is relevant to a given input query. A vector y represents a predicted vector of relevance scores (e.g., one relevance score for each shard s) for a given input query q.

Shard relevance to a query may be defined as:

$$p(s|q) = \frac{\sum_{d \in s} n_{d,q}}{\sum_{d} n_{d,q}} \quad (2)$$

where $n_{d,q}$ is the number of clicks of document d for query q. Accordingly, the shard relevance score is defined as the sum of the number of clicks for each document stored in the shard s (for the query q) divided by the sum of the number of clicks of all documents d for the query q, irrespective of shard. Accordingly, per-query shard relevance is quantified using document relevance and shard membership. A "click," as used herein, refers to any selection of content displayed or otherwise made perceivable. In some examples, "clicks" may include selecting of content using a mouse, touch input, voice command-based selection, gesture-based input, vision-tracking based input, loading one or more webpages related to content, clicking on links related to particular content, etc.

As previously described, one document may exist in multiple shards. For example, a specific "running shoes" product may exist in both the "Clothing, Shoes & Jewelry" and "Sports & Outdoors" shards on an online retailer search system. Accordingly, the problem is a multi-label classification problem rather than a multi-class classification problem. As such, $\Sigma p(s|q)$ is not always equal to 1. As used herein, y denotes the vector of relevance scores of all shards for a given query q, where $y_i = p(s_i|q)$, which corresponds to the relevance score of the i-th shard $s_i$. Using existing data (e.g., data describing the number of clicks on different documents for a given input query) the shard relevance prediction model 120 is trained to predict y for an arbitrary input query. In at least some examples, the shard relevance prediction model 120 may determine the predicted number of clicks (e.g., predicted clicks and/or predicted documents interactions) for documents of each shard for each input query. Additionally, shard relevance prediction model 120 may determine shard relevance using equation (2) above.

After training, the per-shard relevance scores $\hat{y}_i$ may be compared to a relevancy threshold value α (sometimes referred to as a threshold score) by query understanding service 140. In various examples, query understanding service 140 may send a query q to a particular shard only if the per-shard relevance scores $\hat{y}_i$ exceeds the threshold value α. Accordingly, the threshold value a may define a minimum relevance score for sending a query to a particular shard for processing. In this way, shards with categories that are not relevant to the input query are not searched reducing infrastructure cost, latency of document retrieval, and congestion of the server instances.

Model Architecture

In an embodiment, in order to generate a discriminative multi-label classification model to predict ŷ given the input query, a feature vector x and design a function $f(x)$ (possibly with parameters to be learned) are determined to transform the input features into some other representation. The prediction can be written as:

$$\hat{y} = \text{sigmoid}(W \cdot f(x) + b) \quad (3)$$

where weight/parameter matrix W and vector b (e.g., bias) are also parameters to be learned. The sigmoid function is applied to each value individually in the input vector. The parameters may be learned using binary cross-entropy (Equation 4) as the loss function.

$$L(y, \hat{y}) = -\Sigma_i y_i \log \hat{y}_i + (1 - y_i) \log(1 - \hat{y}_i) \quad (4)$$

In contrast, multi-class classification approaches apply the softmax function in the output layer so that $\Sigma_i \hat{y}_i = 1$. The choice of loss function also makes the distinction between multi-label classification and multi-class classification, where for the multi-class classification case, categorical cross-entropy loss is used, which does not contain the $(1 - y_i) \log(1 - \hat{y}_i)$ term.

In natural language processing (NLP) a token refers to an instance of a sequence of characters in a document or input text that are grouped together as a useful semantic input for processing. If each dimension of the input feature vector represents the presence of a token in the query, and $f$ is the identify function, then the model is essentially performing logistic regression jointly for all the labels (e.g., all the label data). Deep learning has demonstrated effectiveness in natural language processing tasks. As such, models typically used in natural language processing tasks such as recurrent neural networks (RNN) and/or transformer networks may be used in the design of $f(x)$. However, while such models are better at modeling the dependency among tokens, performance gains may be achieved at the expense of high computation cost. When the input query often consists of a few tokens and does not resemble a complete natural language sentence (e.g., in the typical product search context), high model capacity may be unnecessary to achieve high performance for the product search shard classification task. Additionally, relatively small and shallow feed-forward networks can achieve good performance in NLP tasks with high efficiency in training and inference relative to RNNs, LSTMs, and/or transformer-based models. Advantageously, smaller and more shallow feed-forward networks may reduce overall training time, as with fewer layers, the depth of back propagation is reduced.

Figure 2:
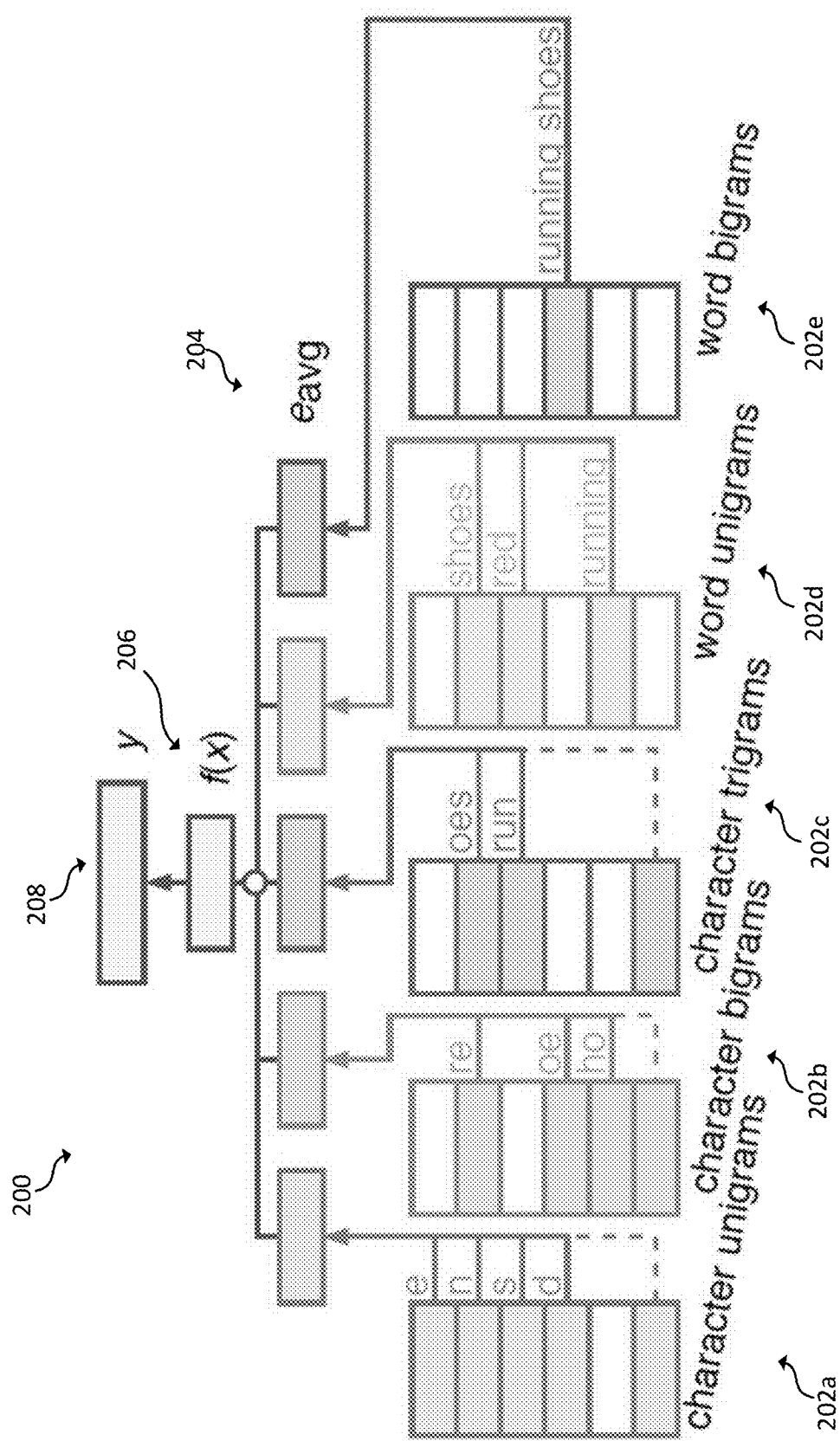
FIG. 2 is a diagram illustrating an example feed forward machine learning model for predicting per-query shard relevance, in accordance with various embodiments of the present disclosure.

FIG. 2 is a diagram illustrating an example feed forward machine learning model 200 for predicting per-query shard relevance, in accordance with various embodiments of the present disclosure. As depicted, in various examples, the feed-forward machine learning model 200 may receive character-level and word-level n-gram tokens as input (e.g., character-level token data and/or word-level token data). For example, for the query "red running shoes", the list of character trigrams 202c is "^re", "red", "ed␣", "d␣r", "␣ru", "run", . . . , "oes", "es$", where "^" and "$" mark the start and end of the query and "␣" is the whitespace symbol. In the example depicted in FIG. 2, input tokens may include one or more of character unigrams 202a, character bigrams 202b, character trigrams 202c, word unigrams 202d, word bigrams 202e, etc. More or fewer token inputs may be used in accordance with the desired implementation.

Fixed-size buckets may be defined for each unique character unigram 202a, bigram 202b, and trigram 202c. In various examples, only the most frequent x number of word n-grams from the training set may be allowed into the vocabularies. Additionally, it may be ensured that the pointwise mutual information of each n-gram is greater than a value y (e.g., 0.5) when n>1. The position of each character n-gram may be determined using a hash function. The vocabulary of word unigrams 202d and bigrams 202e may be learned from training samples. Additionally, fixed-size buckets may be defined for out-of-vocabulary word n-grams. The index into buckets or vocabularies are used to look up embedding vectors in the embedding table of each n-gram type. The token embedding vectors for each n-gram type are averaged across the whole utterance, and then concatenated to form the whole-query embedding $e_{avg}$ (204). The query embedding 204 may be transformed using a rectified linear units (ReLU) activation layer to get the final representation of the query $$f(x) = \text{relu}(W_h \cdot e_{avg} + b_h) \quad (5)$$

where matrix $W_h$ and vector $b_h$ are parameters to be learned.

Feature hashing may be used to restrict the size of the feature space and may make the model robust against misspelling. Including start, end, and whitespace symbols in character n-grams, as well as the addition of word bigrams enables the model to capture word context and dependency. The query embedding $e_{avg}$ (204) may be input into the function $f(x)$ (206) and may generate the predicted output ŷ (208) denoting the vector of relevance scores for all shards s for a given query q.

Model Performance

Dataset. Product click counts (e.g., document click counts) may be aggregated from an anonymized query log (e.g., a log of previously-executed search queries) within a certain time period in a certain locale (e.g., within the United States). Using the click count for all query-product pairs, the relevancy score of product categories (e.g., shards may be partitioned on a per-product category basis) may be determined for all queries using equation (2) using the membership information from products to product categories (e.g., shards) in the catalog. Accordingly, a training data instance may comprise a previously-executed query along with multiple labels (e.g., label data) comprising a relevancy score of the previously-executed query for each shard. In various examples, queries with frequencies below a certain threshold may be removed from the dataset. In at least one example, such techniques may result in a large dataset (e.g., ~250 million unique queries). With such a dataset, a large percentage (e.g., 98%) of the data may be used for training, while sampling a relatively small number of samples (e.g., 360,000 samples) from the remaining 2% of the dataset for validation and testing, respectively. In the example implementation described above, a query in the training set does not appear in the validation or test set.

It should be appreciated that the techniques described herein are agnostic to language. Accordingly, a model may be trained using a dataset in any desired language. Accordingly, a set of models may be deployed, one for each language, in order to ensure per-query prediction of shard relevance for search queries of different languages.

As previously described, y and ŷ represent the respective vectors for the true and predicted category/shard probability, where the i-th component is the probability for the i-th category. The terms "category" and "shard" (or database partition) are used interchangeably herein since a single shard or database partition is typically limited to a particular data category or product category. The following metrics are defined to measure the quality of the shard relevancy prediction (for a given query).

One way of measuring prediction quality may be to measure the similarity between the two probability vectors y and ŷ. However, use of mean squared error (MSE) may not be the best option since the vector tends to be sparse, and so the metric is often a very small value. Accordingly, in the current example, Jaccard similarity is used. Jaccard similarity is defined as follows:

$$Jaccard(y, \hat{y}) = \frac{\sum_i \min(y_i, \hat{y}_i)}{\sum_i \max(y_i, \hat{y}_i)} \quad (6)$$

Precision and recall at the threshold α is defined in Equations 7 and 8, respectively, where I[•] is the indicator function.

$$Precision_\alpha(y, \hat{y}) = \frac{\sum_i I[y_i > \alpha \wedge \hat{y}_i > \alpha]}{\sum_i I[\hat{y}_i > \alpha]} \quad (7)$$

$$Recall_\alpha(y, \hat{y}) = \frac{\sum_i I[y_i > \alpha \wedge \hat{y}_i > \alpha]}{\sum_i I[y_i > \alpha]} \quad (8)$$

Precision generally refers to the percentage of model results that are deemed relevant. Recall generally refers to the percentage of total relevant results correctly classified by the model. In various examples, the machine learning models described herein may provide comparable recall performance to more training-intensive models (e.g., LSTMs, transformer-based models, etc.). Note that the precision and recall metrics defined herein are slightly different than their standard definitions, where the ground-truth labels are binary labels and while the model may output a probability. The precision and recall definitions above are indicative of how well the predicted shard cutoff α mimics the decision made from past behavior data, at a different threshold α. For all metrics, the average across all queries in the test set are reported. FIG. 3 depicts a table illustrating similarities between ground truth and prediction data across different locales, in accordance with various embodiments of the present disclosure. In the example in FIG. 3, tokenization C1, 2, 3 refers to the character unigrams, bigrams, and trigrams, respectively, while W1, 2 refers to the word unigrams and bigrams.

Figure 4:
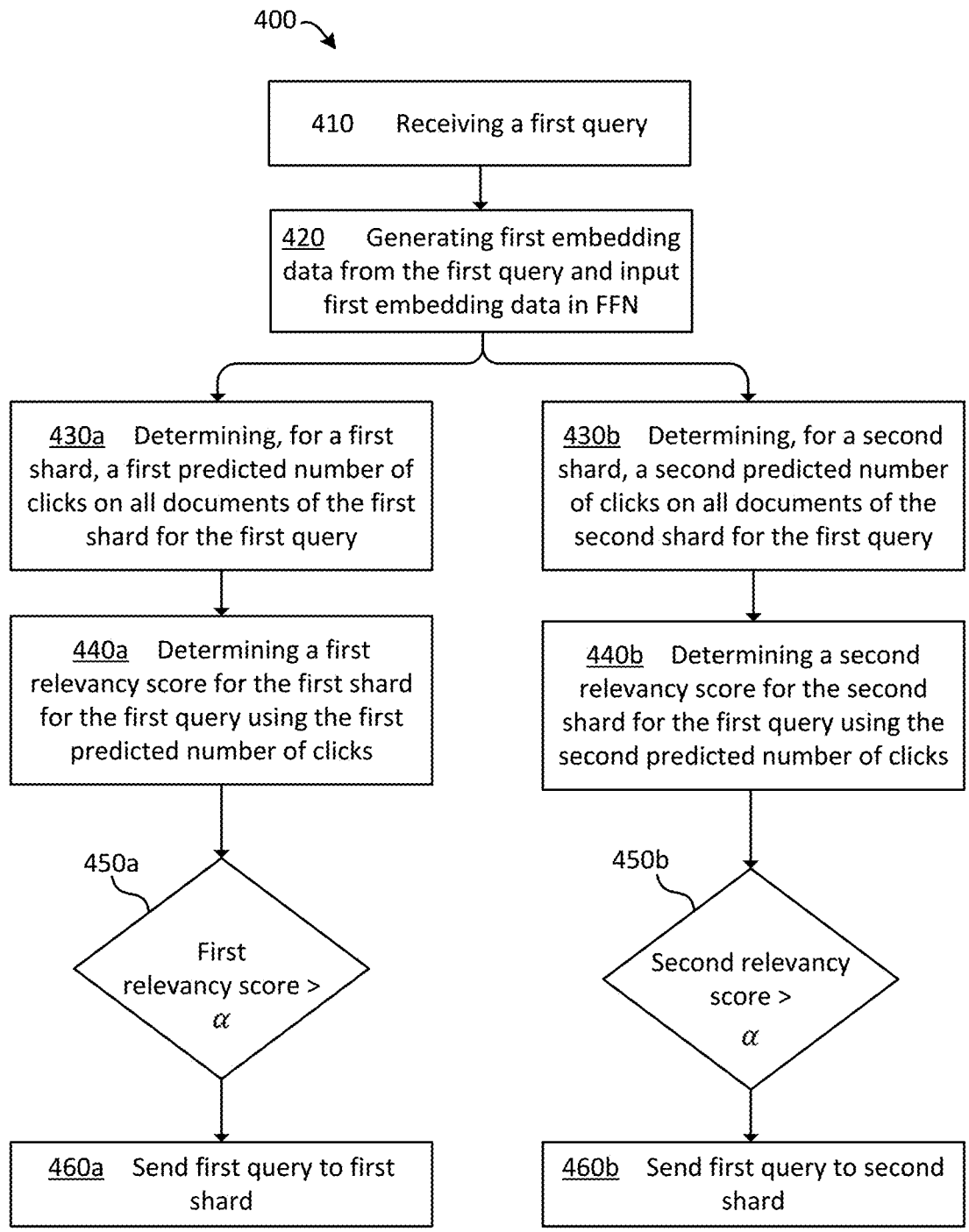
FIG. 4 is a flow chart illustrating an example process for selecting shards to which to send queries for processing, in accordance with various aspects of the present disclosure.

FIG. 4 is a flow chart illustrating an example process for selecting shards to which to send queries for processing, in accordance with various aspects of the present disclosure. Those portions of FIG. 4 that have been previously discussed in reference to FIGS. 1-3 may not be described again for purposes of clarity and brevity. The actions of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 400 of FIG. 4 may begin at action 410, at which a first query may be received. The first query may be, for example, a product search query such as "black leather belt" or "queen sized sheets," etc. At action 420, embedding data may be generated from the first query. For example, character unigrams, bigrams, and/or trigrams and/or word unigrams and/or bigrams may be generated from the input query. Embedding vectors may be determined for each token, as described above. Thereafter, the embedding vectors may be averaged across the input query and may be concatenated to generate the whole-query embedding $e_{avg}$. In various examples, the whole-query embedding may be transformed using a ReLU layer and may be input into the feed forward network.

Processing may continue from action 420 to actions 430a and 430b. It should be appreciated that the feed forward network may generate an output vector ŷ that may reflect a relevancy score for each shard in the distributed database for the input query. For ease of illustration, FIG. 4 describes the prediction of $\hat{y}_1$ and $\hat{y}_2$ for a first shard and a second shard (for the input query). It should be appreciated that the techniques described herein may be used with any number of shards or other database partitions. At action 430a, a first predicted number of clicks on all documents stored by the first shard may be predicted for the first query by the feed forward network. Similarly, at action 430b, a second predicted number of clicks on all documents stored by the second shard may be predicted for the first query by the feed forward network.

Processing may proceed from action 430a to action 440a, at which the feed forward network may determine a first relevancy score for the first shard for the first query using the first predicted number of clicks. The first relevancy score may be determined in accordance with equation 2, above. Similarly, processing may proceed from action 430b to action 440b, at which the feed forward network may determine a second relevancy score for the second shard for the first query using the second predicted number of clicks. The second relevancy score may be determined in accordance with equation 2, by the feed forward network. The first relevancy score represents a prediction by the feed forward network of the relevancy of the first query to a category of data (e.g., products/documents) stored in the first shard. Similarly, the second relevancy score represents a prediction by the feed forward network of the relevancy of the first query to a category of data (e.g., products/documents) stored in the second shard.

At action 450a, a determination may be made whether the first relevancy score exceeds a relevancy threshold value α. If so, the first query may be sent to the first shard at action 460a and used to query the documents stored therein. If not, the first shard may not be queried, as the category of documents/products stored by the first shard have been deemed not sufficiently relevant to the first query.

Similarly, at action 450b, a determination may be made whether the second relevancy score exceeds the relevancy threshold value α. If so, the first query may be sent to the second shard at action 460b and used to query the documents stored therein. If not, the second shard may not be queried, as the category of documents/products stored by the second shard have been deemed not sufficiently relevant to the first query.

Figure 5:
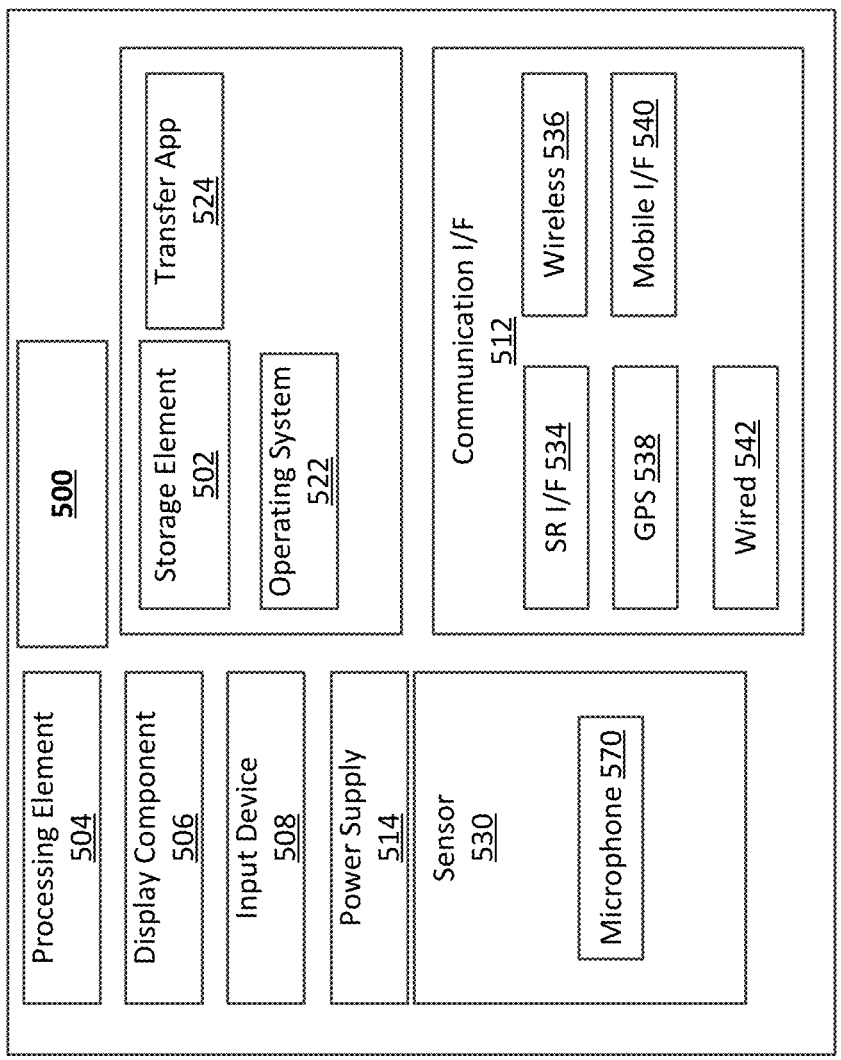
FIG. 5 is a block diagrams showing an example architecture of a computing device that may be used in accordance with various embodiments described herein.

FIG. 5 is a block diagram showing an example architecture 500 of a computing device used to at least partially implement per-query prediction of shard relevance, in accordance with various aspects of the present disclosure. It will be appreciated that not all devices will include all of the components of the architecture 500 and some user devices may include additional components not shown in the architecture 500. In an example embodiment, the architecture 500 includes one or more processing elements 504 for executing instructions and retrieving data stored in a storage element 502. The processing element 504 comprises at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. In an example embodiment, the storage element 502 comprises flash memory, random-access memory, disk-based storage, etc. Different portions of the storage element 502, for example, are used for program instructions for execution by the processing element 504, storage of images or other digital works, and/or a removable storage for transferring data to other devices, etc. Additionally, storage element 502 may store various costs, shards, parameters of machine learning models, vocabulary data structures, etc.

The storage element 502 may also store software for execution by the processing element 504. An operating system 522 may provide the user with an interface for operating the computing device and may facilitate communications and commands between applications executing on the architecture 500 and various hardware thereof. In an example embodiment, a transfer application 524 is configured to receive images, audio, and/or video from another device (e.g., a mobile device, image capture device, and/or display device) and/or from microphone 570 included in the architecture 500.

When implemented in some user devices, the architecture 500 comprises a display component 506. The display component 506 can comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images.

The architecture 500 may also include one or more input devices 508 operable to receive inputs from a user. Example input devices 508 include a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

In an embodiment, the communication interface 512 comprises one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. In an embodiment, a short range interface 534 is configured to communicate using one or more short range wireless protocols such as, for example, near field communications (NFC), Bluetooth®, Bluetooth LE, etc. In an embodiment, a mobile interface 540 is configured to communicate utilizing a cellular or other mobile protocol. A Global Positioning System (GPS) interface 538 may be in communication with one or more earth-orbiting satellites or other suitable position-determining systems to identify a position of the architecture 500. In an embodiment, a wired communication module 542 is configured to communicate according to the USB protocol or any other suitable protocol.

The architecture 500 may also include one or more sensors 530 such as, for example, one or more position sensors, image sensors, and/or motion sensors. A microphone 570 is shown in FIG. 5, by way of example.

As noted above, multiple devices may be employed in a single system. In such a multi-device system, each of the devices may include different components for performing different aspects of the system's processing. The multiple devices may include overlapping components. The components of the distributed search system 108, as described herein, are exemplary, and may be located as a stand-alone device or may be included, in whole or in part, as a component of a larger device or system.

Figure 6:
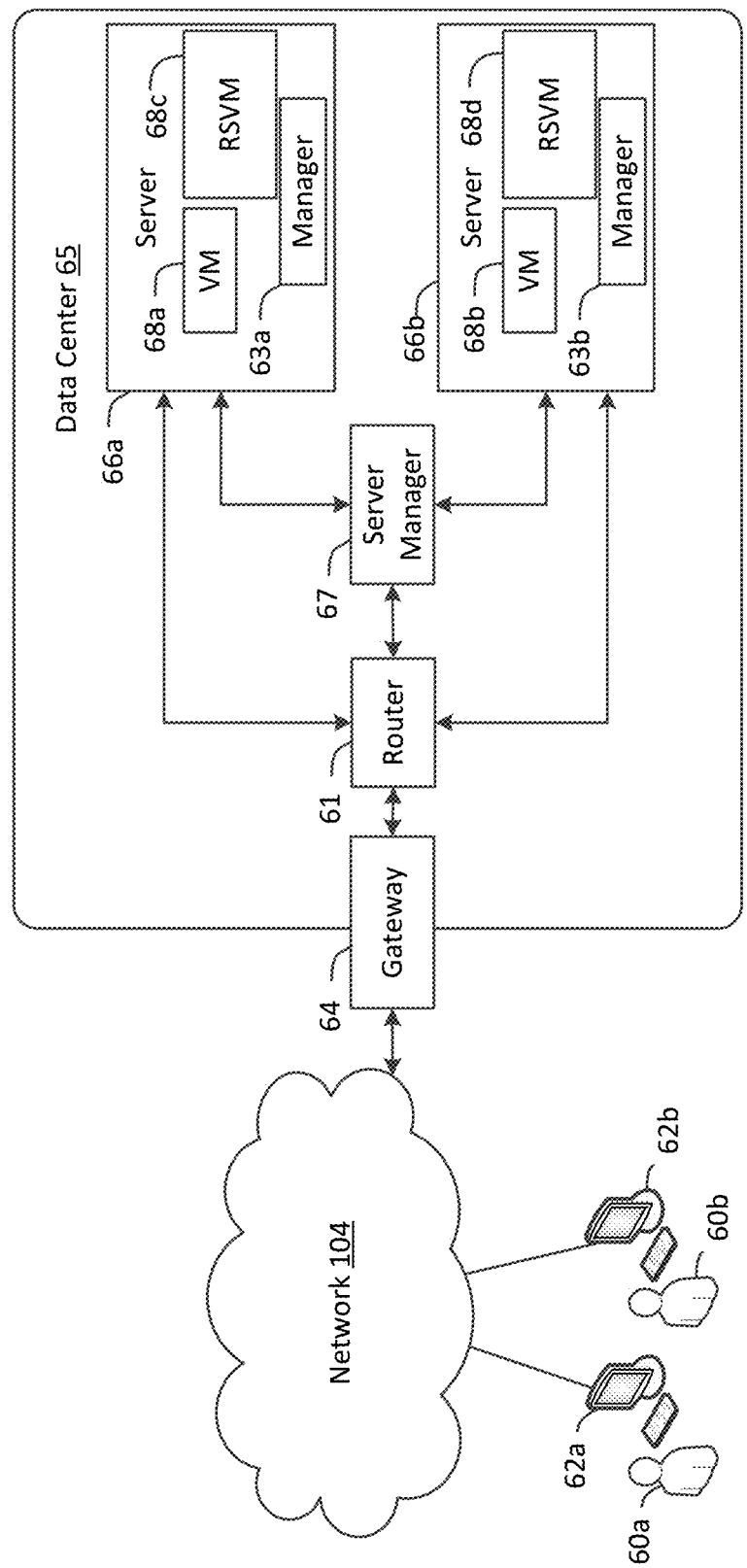
FIG. 6 is a diagram illustrating an example system for sending and providing data that may be used in accordance with the present disclosure.

An example system for sending and providing data and performing various computer processing techniques will now be described in detail. In particular, FIG. 6 illustrates an example computing environment in which the embodiments described herein may be implemented. For example, the computing environment of FIG. 6 may be used to provide ranking of search results as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more techniques of the distributed search system 108, as described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and enabling computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution systems (such as application server instances, Java™ virtual machines (JVMs), general-purpose or special-purpose operating systems, systems that support various interpreted or compiled programming languages such as Ruby, Perl, Python, C, C++ and the like or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
    receiving by a search system a first search query;
    generating, from the first search query, a first token comprising character-level token data;
    generating, from the first search query, a second token comprising word-level token data;
    generating, using the character-level token data and the word-level token data, embedding data;
    inputting the embedding data into a machine learning model;
    determining, by the machine learning model for a first database partition, a first score indicating a relevancy of the first search query to first data stored by the first database partition;
    determining, by the machine learning for a second database partition, a second score indicating a relevancy of the first search query to second data stored by the second database partition;
    determining, based at least in part on the first score, that the first search query is related to the first data stored by the first database partition;
    determining, based at least in part on the second score, that the first search query is unrelated to the second data stored by the second database partition;
    searching the first database partition using the first search query; and
    sending first result data to a computing device.

2. The method of claim 1, further comprising:
determining a first threshold score representing a minimum relevance score to send the first search query to any database partition of a distributed search system;
comparing the first score to the first threshold score;
comparing the second score to the first threshold score; and
sending the first search query to the first database partition based at least in part on the comparing the first score to the first threshold score.

3. The method of claim 1, further comprising:
determining a first number of predicted interactions with data of the first database partition for the first search query;
determining a total number of predicted interactions with data of a plurality of database partitions, the plurality of database partitions including the first database partition and the second database partition; and
determining the first score based at least in part on dividing the first number by the total number.

4. The method of claim 1, further comprising:
determining a first number of interactions with data of the first database partition for a second search query;
determining a second number of interactions with data of the second database partition for the second search query; and
updating parameters of the machine learning model based at least in part on the first number of interactions and the second number of interactions, wherein the machine learning model generates the first score and the second score.

5. The method of claim 1, further comprising:
receiving third data representing a previously-executed search query;
receiving fourth data indicating a first number of document interactions associated with the first database partition for the previously-executed search query;
receiving fifth data indicating a second number of document interactions associated with the second database partition for the previously-executed search query;
generating first label data based at least in part on the fourth data;
generating second label data based at least in part on the fifth data; and
generating a first training data instance comprising the previously-executed search query, the first label data, and the second label data.

6. The method of claim 1, further comprising:
determining, by the machine learning model, the first score based on a first number of clicks on documents stored in the first database partition; and
determining, by the machine learning model, the second score based on a first number of clicks on documents stored in the second database partition.

7. The method of claim 1, further comprising:
determining, for a second search query, a first relevancy score for the first database partition;
determining, for the second search query, a second relevancy score for the second database partition;
generating first training data, the first training data comprising the second search query, the first relevancy score, and the second relevancy score; and
updating parameters of the machine learning model using the first training data.

8. The method of claim 1, further comprising determining, based at least in part on the second score, that the second database partition is not to be queried using the first search query.

9. A system, comprising:
at least one processor; and
at least one non-transitory computer-readable memory storing instructions that, when executed by the at least one processor, are effective to program the at least one processor to:
receive by a search system a first search query;
determine, for a first database partition, a first score indicating a relevancy of the first search query to first data stored by the first database partition;
determine, for a second database partition, a second score indicating a relevancy of the first search query to second data stored by the second database partition;
determine, based at least in part on the first score, that the first search query is related to the first data stored by the first database partition;
determine, based at least in part on the second score, that the first search query is unrelated to the second data stored by the second database partition;
search the first database partition using the first search query;
send first result data to a computing device;
determine, for a second search query, a first relevancy score for the first database partition;
determine, for the second search query, a second relevancy score for the second database partition;
generate first training data, the first training data comprising the second search query, the first relevancy score, and the second relevancy score; and
update parameters of a machine learning model using the first training data.

10. The system of claim 9, the at least one non-transitory computer-readable memory storing further instructions that, when executed by the at least one processor are further effective to program the at least one processor to:
determine a first threshold score representing a minimum relevance score to send the first search query to any database partition of a distributed search system;
compare the first score to the first threshold score;
compare the second score to the first threshold score; and
send the first search query to the first database partition based at least in part on the comparison of the first score to the first threshold score.

11. The system of claim 9, the at least one non-transitory computer-readable memory storing further instructions that, when executed by the at least one processor are further effective to program the at least one processor to:
determine a first number of predicted interactions with data of the first database partition for the first search query;
determine a total number of predicted interactions with data of a plurality of database partitions, the plurality of database partitions including the first database partition and the second database partition; and
determine the first score based at least in part on dividing the first number by the total number.

12. The system of claim 9, the at least one non-transitory computer-readable memory storing further instructions that, when executed by the at least one processor are further effective to program the at least one processor to:
determine a first number of interactions with data of the first database partition for a third search query;

determine a second number of interactions with data of the second database partition for the third search query; and update parameters of the machine learning model based at least in part on the first number of interactions and the second number of interactions, wherein the machine learning model generates the first score and the second score.

13. The system of claim 9, the at least one non-transitory computer-readable memory storing further instructions that, when executed by the at least one processor are further effective to program the at least one processor to:
generate, from the first search query, a first token comprising character-level token data;
generate, from the first search query, a second token comprising word-level token data;
generate, using the character-level token data and the word-level token data, embedding data; and
input the embedding data into the machine learning model, wherein the machine learning model determines the first score and the second score based at least in part on the input of the embedding data.

14. The system of claim 9, the at least one non-transitory computer-readable memory storing further instructions that, when executed by the at least one processor are further effective to program the at least one processor to:
receive third data representing a previously-executed search query;
receive fourth data indicating a first number of document interactions associated with the first database partition for the previously-executed search query;
receive fifth data indicating a second number of document interactions associated with the second database partition for the previously-executed search query;
generate first label data based at least in part on the fourth data;
generate second label data based at least in part on the fifth data; and
generate a first training data instance comprising the previously-executed search query, the first label data, and the second label data.

15. The system of claim 9, the at least one non-transitory computer-readable memory storing further instructions that, when executed by the at least one processor are further effective to program the at least one processor to:
determine, by the machine learning model, the first score based on a first number of clicks on documents stored in the first database partition; and
determine, by the machine learning model, the second score based on a first number of clicks on documents stored in the second database partition.

16. A method comprising:
receiving by a search system a first search query;
determining, for a first database partition, a first score indicating a relevancy of the first search query to first data stored by the first database partition;
determining, for a second database partition, a second score indicating a relevancy of the first search query to second data stored by the second database partition;
determining, based at least in part on the first score, that the first search query is related to the first data stored by the first database partition;
determining, based at least in part on the second score, that the first search query is unrelated to the second data stored by the second database partition;
searching the first database partition using the first search query;
sending first result data to a computing device;
determining, for a second search query, a first relevancy score for the first database partition;
determining, for the second search query, a second relevancy score for the second database partition;
generating first training data, the first training data comprising the second search query, the first relevancy score, and the second relevancy score; and
updating parameters of the machine learning model using the first training data.

17. The method of claim 16, further comprising:
determining a first threshold score representing a minimum relevance score to send the first search query to any database partition of a distributed search system;
comparing the first score to the first threshold score;
comparing the second score to the first threshold score; and
sending the first search query to the first database partition based at least in part on the comparing the first score to the first threshold score.

18. The method of claim 16, further comprising:
determining a first number of predicted interactions with data of the first database partition for the first search query;
determining a total number of predicted interactions with data of a plurality of database partitions, the plurality of database partitions including the first database partition and the second database partition; and
determining the first score based at least in part on dividing the first number by the total number.

19. The method of claim 16, further comprising:
determining a first number of interactions with data of the first database partition for a second search query;
determining a second number of interactions with data of the second database partition for the second search query; and
updating parameters of the machine learning model based at least in part on the first number of interactions and the second number of interactions, wherein the machine learning model generates the first score and the second score.

20. The method of claim 16, further comprising:
receiving third data representing a previously-executed search query;
receiving fourth data indicating a first number of document interactions associated with the first database partition for the previously-executed search query;
receiving fifth data indicating a second number of document interactions associated with the second database partition for the previously-executed search query;
generating first label data based at least in part on the fourth data;
generating second label data based at least in part on the fifth data; and
generating a first training data instance comprising the previously-executed search query, the first label data, and the second label data.

* * * * *